US 6,559,984 B1

United States Patent
Lee et al.

(10) Patent No.: US 6,559,984 B1
(45) Date of Patent: May 6, 2003

(54) APPARATUS FOR MONITORING OPTICAL PATH BASED ON THE IDENTIFICATION OF OPTICAL CROSS-CONNECT INPUT PORTS

(75) Inventors: Chang Hee Lee, Taejon (KR); Sang Yung Shin, Seoul (KR); Chu Kwang Uk, Taejon (KR)

(73) Assignee: Korea Advanced Institute Science and Technology, Taejon (KR)

( * ) Notice: Subject to any disclaimer, the term of this patent is extended or adjusted under 35 U.S.C. 154(b) by 0 days.

(21) Appl. No.: 09/434,843

(22) Filed: Nov. 4, 1999

(30) Foreign Application Priority Data

Apr. 2, 1999 (KR) ............................................. 99-11547

(51) Int. Cl.[7] ......................... H04B 10/08; H04J 14/02; H04J 14/00
(52) U.S. Cl. ..................... 359/110; 359/128; 359/117
(58) Field of Search ................................. 359/110, 117, 359/128; 385/17

(56) References Cited

U.S. PATENT DOCUMENTS

| | | | | |
|---|---|---|---|---|
| 5,546,213 A | * | 8/1996 | Suyama | 359/134 |
| 5,745,274 A | * | 4/1998 | Fatehi et al. | 359/124 |
| 5,754,320 A | * | 5/1998 | Watanabe et al. | 359/117 |
| 5,774,245 A | | 6/1998 | Baker | 359/128 |
| 5,864,574 A | * | 1/1999 | Welch et al. | 359/344 |
| 6,301,399 B1 | * | 10/2001 | Mahapatra et al. | 385/1 |
| 6,396,605 B1 | * | 5/2002 | Heflinger et al. | 359/154 |

OTHER PUBLICATIONS

C. Chan et al., "A Novel Optical–Path Supervisory Scheme for Optical Cross Connects in All–Optical Transport Networks", IEEE Photonics Technology Letters, vol. 10, No. 6, Jun. 1998.*

F. Heismann et al, "Signal Tracking and Performance Monitoring in Multi–Wavelength Optical Networks", 22nd European Conference on Optical Communication, IEEE 1996.*
W. Shieh et al. "A Wavelength–Routing Node Using Multifunctional Semiconductor Optical Amplifiers and Multiple–Pilot–Tone–Coded Subcarrier Control Headers", IEEE Photonics Technology Letter, vol. 9, No. 9, Sep. 1997.*
*Optical Path Monitoring Based on the Identification of Optical Cross–Connect Input Ports*, Kwang Uk Chu, Chang Hee Lee, and Sang Yung Shin, Feb. 21, 1999.
*Signal Tracking and Performance Monitoring in Multi–Wavelength Optical Networks*, Fred Heismann, Mohammad T. Fatehi, Steven K. Korotky, and John J. Veselka, European Conference on Optical Communication (ECOC), 1996.
*Photonic Transport Network Architecture and OA&M Technologies to Create Large–Scale Robust Networks*, Satoru Okamoto, IEEE Journal on Selected Areas in Communications, vol. 16, No. 7, Sep., 1998.
*A Novel Optical–Path Supervisory Scheme for Optical Cross Connects in All–Optical Transport Networks*, Chun Kit Chan, IEEE Photonics Technology Letters, vol. 10, No. 6, Jun., 1998.

(List continued on next page.)

Primary Examiner—Leslie Pascal
Assistant Examiner—Shi K. Li
(74) Attorney, Agent, or Firm—Graybeal Jackson Haley LLP

(57) ABSTRACT

The present invention relates to an optical path monitoring device on the basis of the identification of input ports in optical cross-connect systems. An optical path monitoring apparatus in an optical cross-connect system is provided. The optical cross-connect system in accordance with the present invention includes input ports, wavelength-division demultiplexers, optical switching devices, a control device, optical power regulating devices, wavelength-division multiplexers, and output ports. The optical path monitoring apparatus in accordance with the present invention includes a plurality of pilot tone superimposers, a plurality of optical splitters, and a plurality of pilot tone detectors.

9 Claims, 15 Drawing Sheets

OTHER PUBLICATIONS

*New Optical Monitoring Method Based on the Identification of Optical Cross–Connect Input Ports*, Kwang Uk Chu, Chang Hee Lee, Sang Yung Shin, Nov. 5, 1998.

*Optical Path Monitoring Based on the Identification of Optical Cross–Connect Input Ports*, Kwang Uk Chu, Chang Hee Lee, and Sang Yung Shin, Feb. 21, 1999.

* cited by examiner

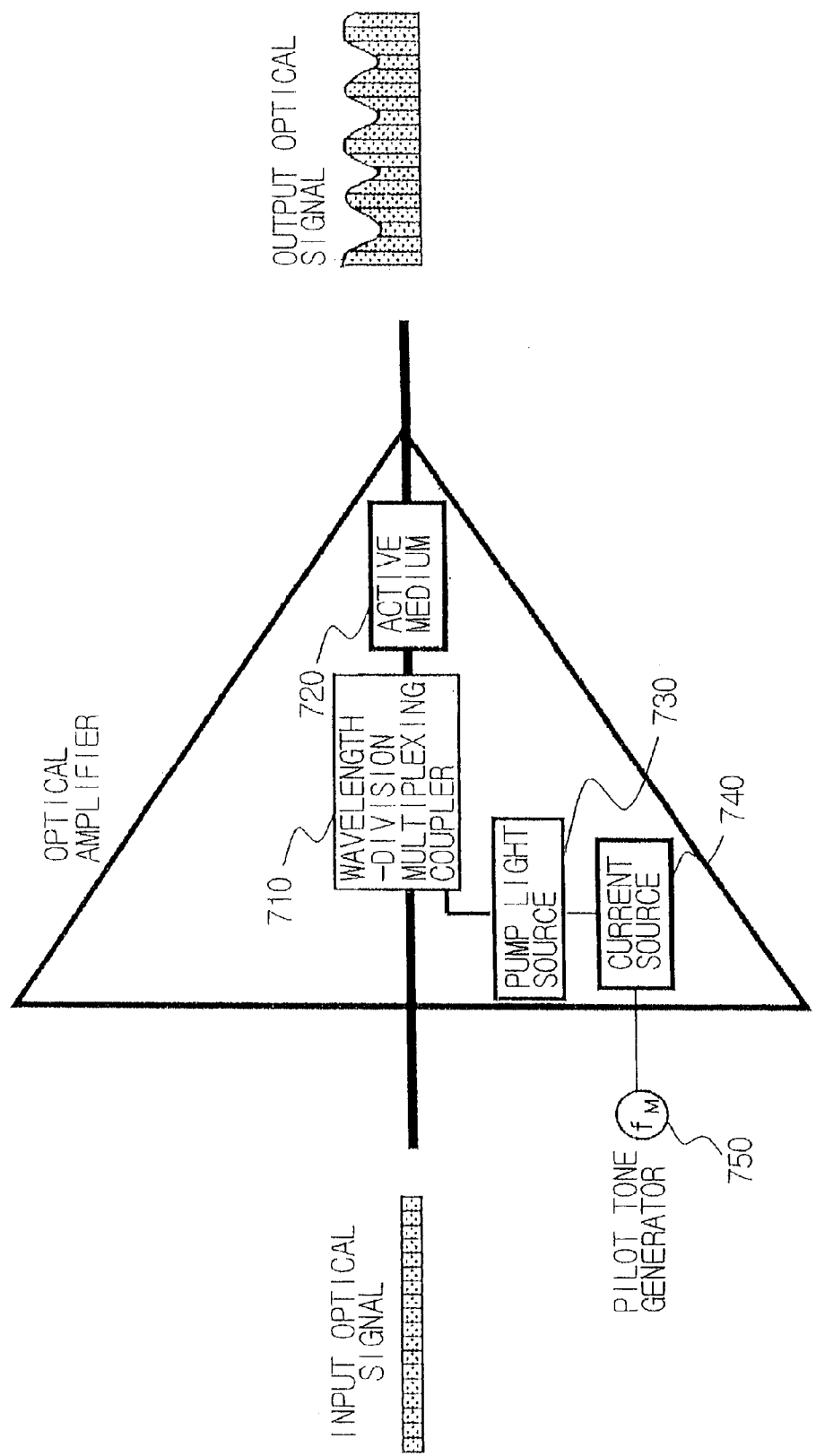

APPARATUS FOR MONITORING OPTICAL PATH BASED ON THE IDENTIFICATION OF OPTICAL CROSS-CONNECT INPUT PORTS

TECHNICAL FIELD

The present invention relates to an optical path monitoring device on the basis of the identification of input ports in optical cross-connect systems.

BACKGROUND OF THE INVENTION

The optical path is a logical path between two optical terminal devices sending and receiving optical signals in optical transport networks.

In optical transport networks, the optical path is established with the help of wavelength-division multiplexing optical communication technology.

FIG. 1 is a diagram illustrating an optical transport network in accordance with an embodiment of the present invention under the assumption that wavelength conversion is not occurred. As shown in FIG. 1, optical signals of wavelength 1, wavelength 2, and wavelength 3 are multiplexed and transmitted. The optical signals of the same wavelength are routed independently at each node and an optical path is established between two optical terminal devices. Thanks to wavelength-division multiplexing optical communication, one optical link can have more than 2 optical paths.

The optical transport network is reconfigurable, which reestablishes routing at nodes and copes with traffic congestion and optical link fault.

Since the optical transport network has transparency, it is able to work with new optical terminal devices and changes of transmission signal format.

The nodes of the optical transport networks employ optical cross-connect systems, which route optical signals with respect to wavelengths.

Optical paths at optical transport networks are determined by routing state of optical cross-connect systems. More particularly, the optical paths depend on switching state of optical switching device in the optical cross-connect system.

Problems occur in the whole network when the optical switching devices don't work properly, which means it operates differently from the way the network management system commands.

Therefore, the optical paths of signals need to be monitored in order to increase the fidelity of optical transport network management.

The best way to monitor optical paths is to maintain current telecommunication standard as much as possible.

The conventional methods of monitoring optical paths are shown in FIG. 2, FIG. 3, FIG. 4a, and FIG. 4b.

In FIG. 2, each optical terminal device superimposes unique pilot tone of low frequency on optical signals to be transmitted. The pilot tone frequencies are determined not to be affected by the signal modulation frequency. The notation 'wavelength i ($P_j$)' stands for the optical signal of wavelength i superimposed by pilot tone j.

The optical paths of optical signals are monitored by the pilot tone detector that is installed at each node and detects the pilot tone superimposed on the optical signals.

In order to transmit the pilot tone, the frequency of the pilot tone needs to be within the transmission bandwidth of optical amplifiers.

As the size of optical transport network gets bigger and the number of optical amplifiers in an optical path is more than one, the bandwidth that pilot tone can propagate gets smaller. The feasible bandwidth of pilot tone is seriously restricted and therefore the number of optical paths in an optical transport network is also limited.

Additionally, if a number of pilot tones are supplied to an optical amplifier at the same time, a new frequency component is generated because of the nonlinear effect of optical amplifiers. This can cause errors in pilot tone detection.

FIG. 3 is a diagram for illustrating a method monitoring optical paths using optical path overhead. Each optical signal includes optical path overhead and therefore finds out routing state of optical cross-connect systems.

However, a new transmission signal format different from the current standard needs to be determined.

FIG. 4a is a diagram for illustrating a method monitoring optical paths using amplified-spontaneous emission optical channel of optical amplifier.

The optical amplifier 410 compensates transmission loss of optical links. Amplified-spontaneous emission light of the optical amplifier 410 is passed through the Fabry-Perot filter 420 and feedback-amplified. The tunable Fabry-Perot filter is controlled so that its pass-band scans the amplified-spontaneous emission at the unique frequency assigned to each input port of optical cross-connect systems.

As shown in FIG. 4b, the output signal of optical cross-connect systems includes the amplified-spontaneous emission optical channels in addition to the input wavelength-division multiplexed signals. The power of each amplified-spontaneous emission optical channel is modulated at the same frequency as the scanning frequency of the Fabry-Perot filter, from which the amplified-spontaneous emission optical channel originates. The amplified-spontaneous emission optical channels are apart from the wavelength of wavelength-division multiplexed signals by free spectral range of wavelength-division demultiplexers.

Each amplified-spontaneous emission optical channel corresponds with an optical signal of each wavelength one by one and travels through the same optical path in optical cross-connect system.

The same number of fiber bragg gratings 440 as the amplified-spontaneous emission optical channels reflect the amplified-spontaneous emission optical channels and an optical circulator 430 directs the reflected the amplified-spontaneous emission optical channels to the frequency detector. The frequency detector finds out the modulation frequency of each amplified-spontaneous emission optical channel. Routing state of the optical cross-connect system is known from the modulation frequency of the amplified-spontaneous emission optical channel. Then, the routing state is compared with commands received from network management system, and optical paths of optical transport networks are monitored.

Because wavelength range of the amplified-spontaneous emission optical channel is different from the wavelength range of optical signals, transmission of the optical signals is not affected.

A band rejection optical filter 450 is used to completely remove the amplified-spontaneous emission optical channel and therefore the amplified-spontaneous emission optical channels with the same wavelength range can be reused in different optical cross-connect systems.

However, as the size of the optical transport network and the number of optical paths get increased, the wavelength range that amplified-spontaneous emission optical channels can use is significantly reduced with this method.

In addition, optical devices such as tunable Fabry-Perot filters, fiber bragg gratings, optical circulators, and band rejection optical filters are required and it causes additional cost.

SUMMARY OF THE INVENTION

An optical path monitoring apparatus in an optical cross-connect system is provided. The optical cross-connect system in accordance with the present invention includes input ports, wavelength-division demultiplexers, optical switching devices, a switching control device, optical power regulating devices, wavelength-division multiplexers, and output ports. The optical path monitoring apparatus in accordance with the present invention includes a plurality of pilot tone superimposers, a plurality of optical splitters, and a plurality of pilot tone detectors.

The plurality of pilot tone superimposers superimposes pilot tone on wavelength-division multiplexed optical signals and provides the superimposed signals to the wavelength-division demultiplexers. The superimposers are connected with the input ports.

The plurality of optical splitters splits optical signals that are provided by the optical switching devices. Each of the optical splitters is connected with each of the output ports of optical switching devices.

The plurality of pilot tone detectors receives one channel of optical signals, extracts pilot tone and thereby distinguishes which input port of the optical cross-connect system provides the optical channel, and detects optical path errors. The optical signals are split by the optical splitters.

Response time of the optical power regulating device is short enough to remove the pilot tone that is superimposed on the optical channel.

Desirably, the pilot tone superimposers include a wavelength-division multiplexing coupler, an active medium, a pump light source, and a current source.

The wavelength-division multiplexing coupler multiplexes input optical signals and pump light. The active medium absorbs pump light and amplifies optical signals. The pump light source provides energy to the active medium. The current source provides current to the pump light source. The current of the current source is modulated with pilot tone.

Desirably, the pilot tone superimposer includes an active medium and a current source.

The active medium receives current and amplifies optical signals. The current source provides current to the active medium. The current of the current source is modulated with pilot tone.

Desirably, the pilot tone superimposer is an accusto-optic modulator.

Desirably, the pilot tone superimposer is an integrated optical modulator.

Desirably, the pilot tone detector consists of a photo-diode and an electrical band-pass filter.

Desirably, the pilot tone detector consists of a photo-diode and a lock-in amplifier, and the lock-in amplifier uses the superimposed pilot tone as the reference signal.

Desirably, the optical power regulating device uses an accusto-optic modulator as an optical variable attenuator.

Desirably, the optical power regulating device uses an integrated optical modulator as an optical variable attenuator.

BRIEF DESCRIPTION OF THE DRAWINGS

The embodiments of the present invention will be explained with reference to the accompanying drawings, in which:

FIG. 4b is optical spectrums of optical signals at A–AA and B–BB of FIG. 4a;

FIG. 7a is a block diagram illustrating an optical amplifier achieving energy from pump light source driven by current source modulated with pilot tone and thereby performing pilot tone superimposition and optical amplification simultaneously;

FIG. 8d is waveforms of signals illustrating optical power regulation and pilot tone suppression caused by the optical power regulating device of FIG. 8a.

DETAILED DESCRIPTION OF THE INVENTION

Figure 1:
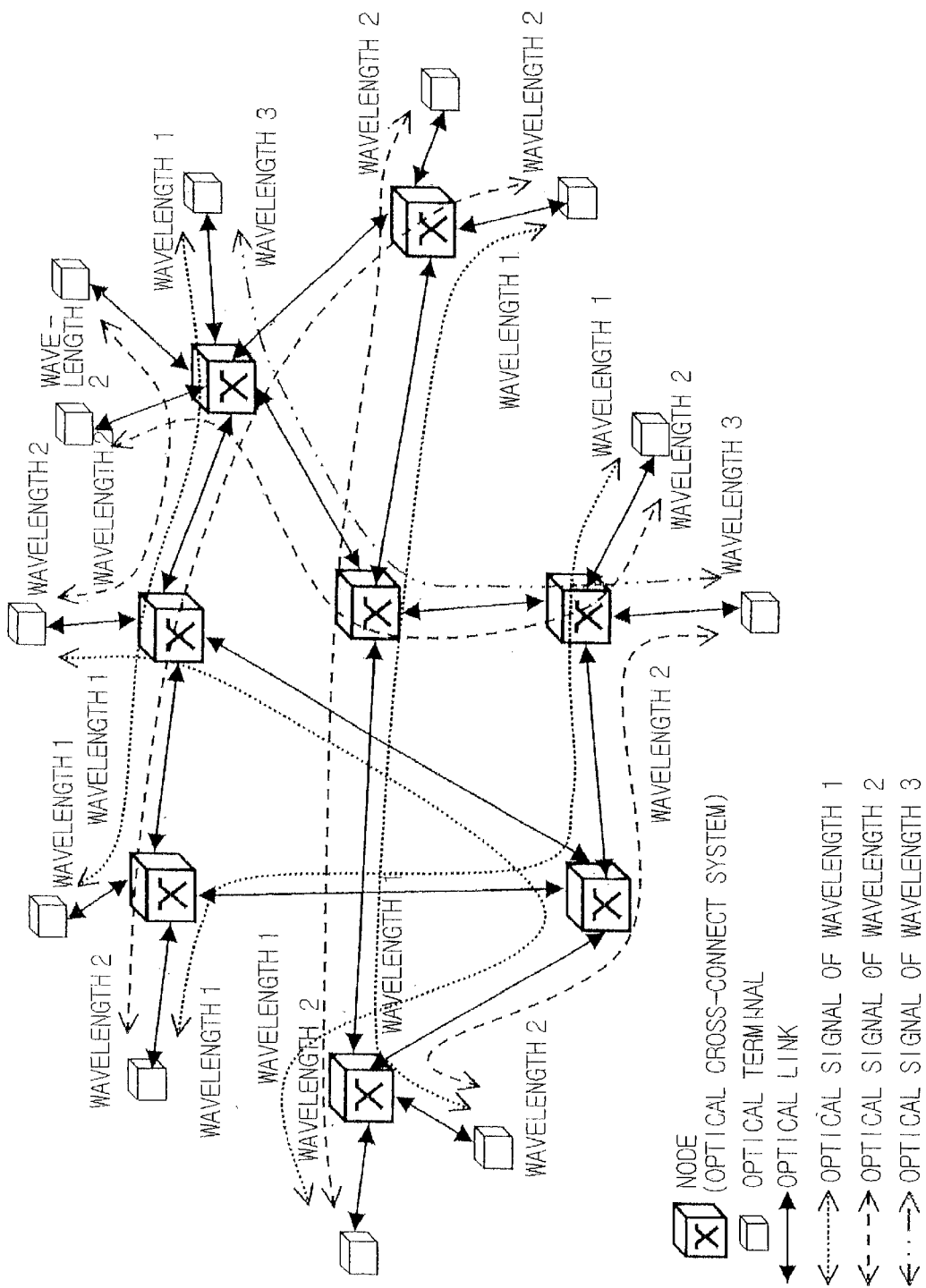
FIG. 1 is a diagram illustrating an optical transport network in accordance with an embodiment of the present invention.
Figure 2:
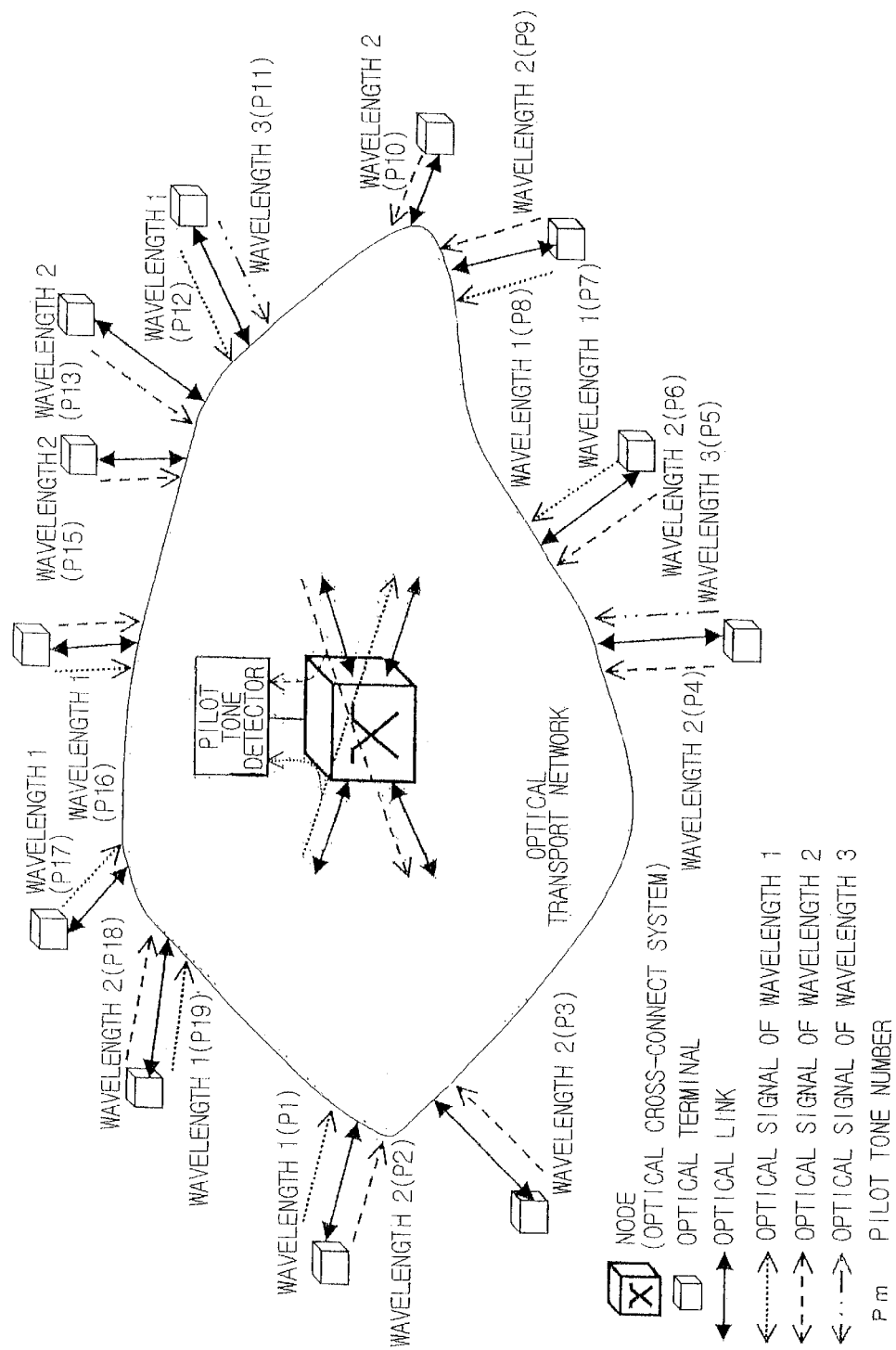
FIG. 2 is a diagram for illustrating a method monitoring optical paths using conventional pilot tone.
Figure 3:
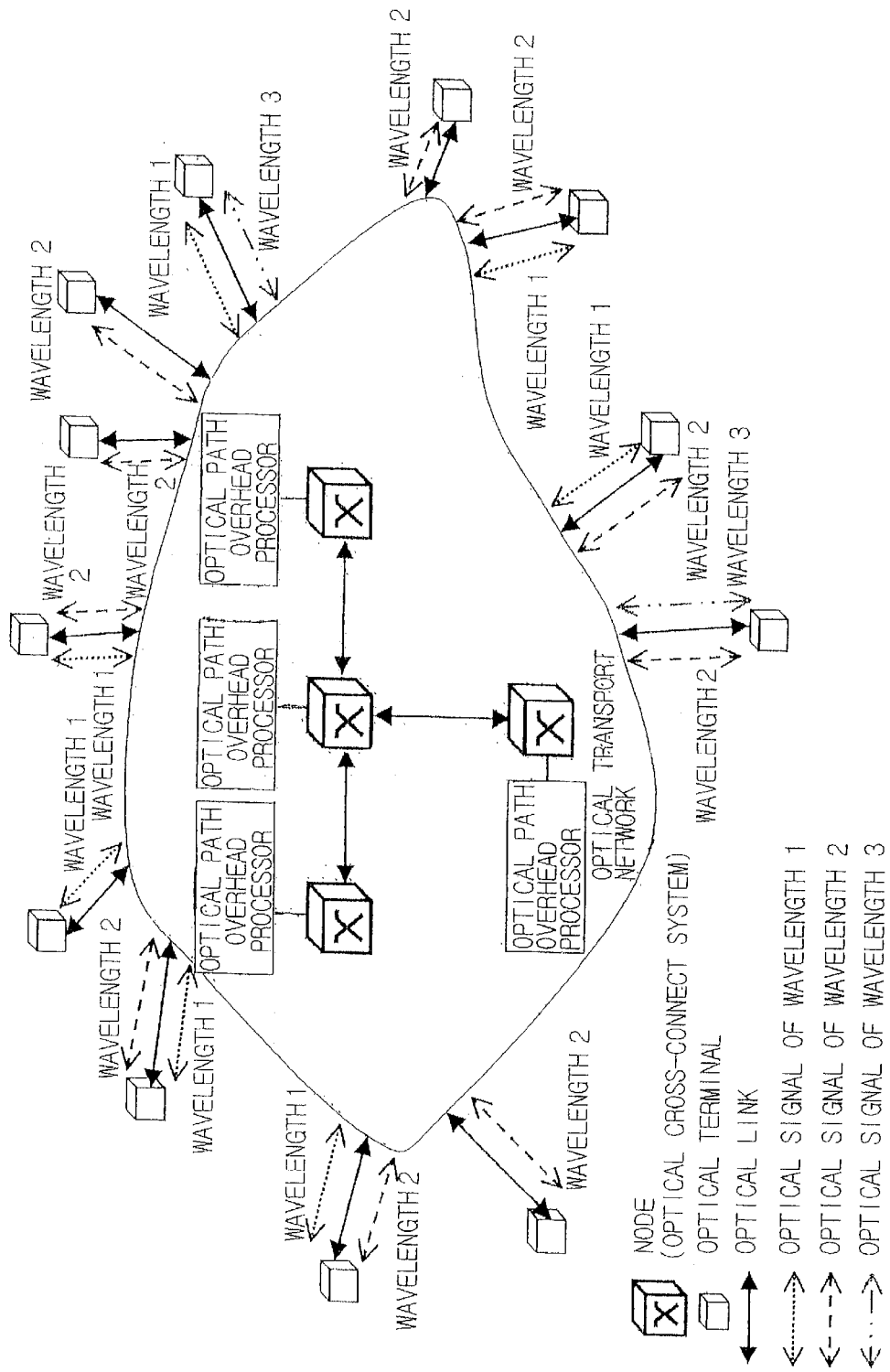
FIG. 3 is a diagram for illustrating a method monitoring optical paths using optical path overhead.
Figure 4A:
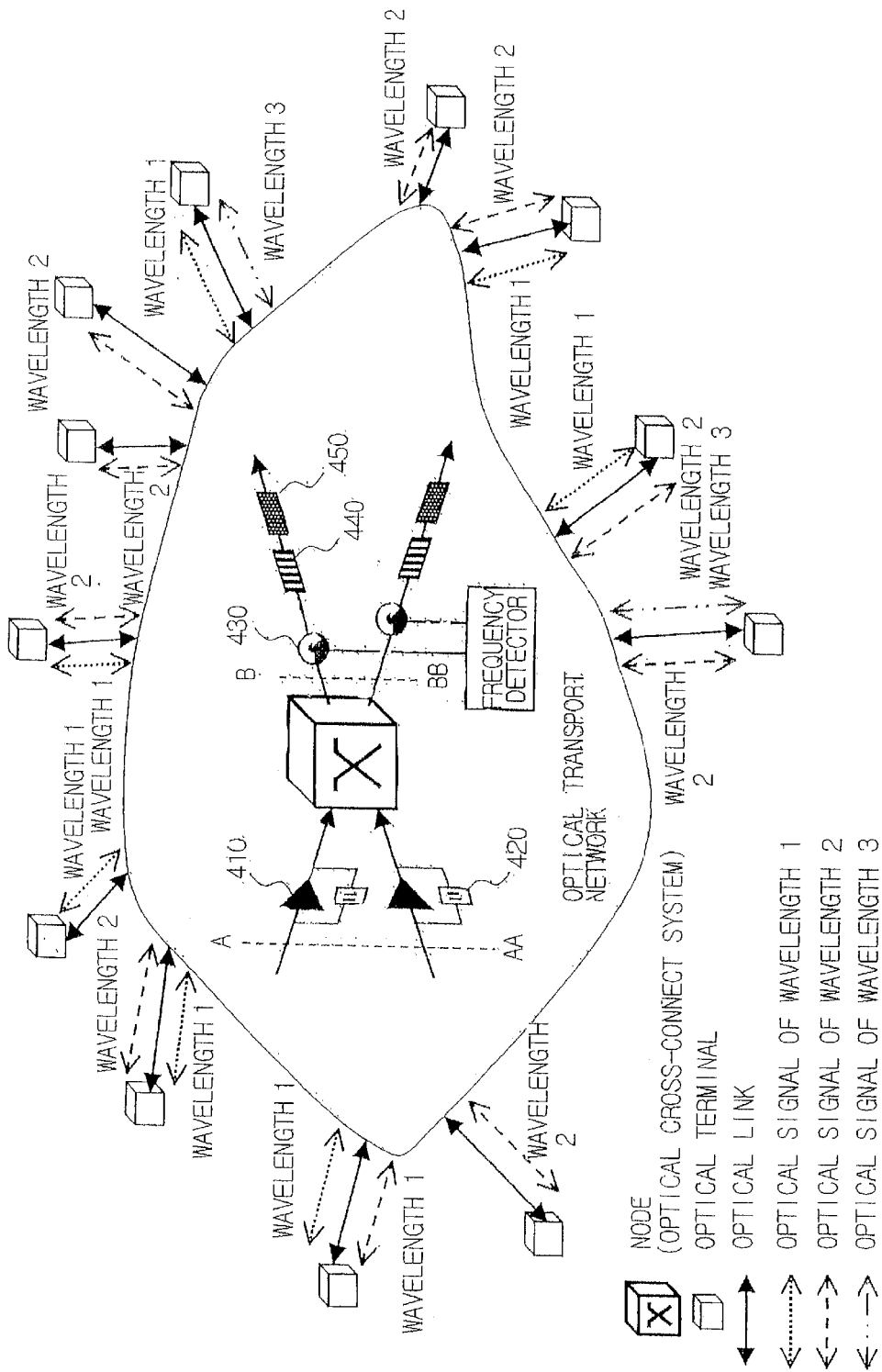
FIG. 4a is a diagram for illustrating a method monitoring optical paths using amplified-spontaneous emission optical channel of optical amplifier.
Figure 4B:
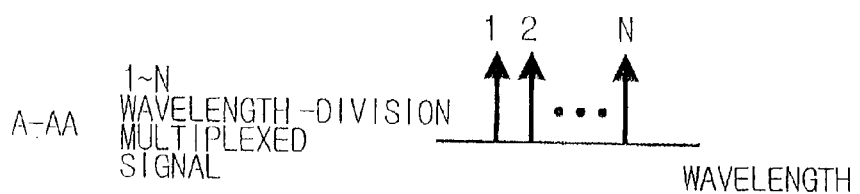
Figure 4B:
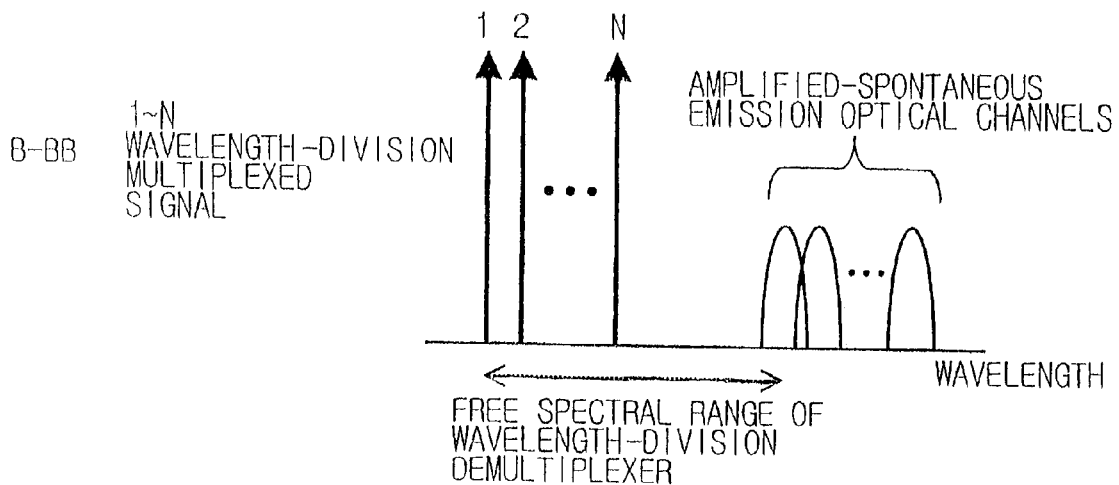
Figure 5A:
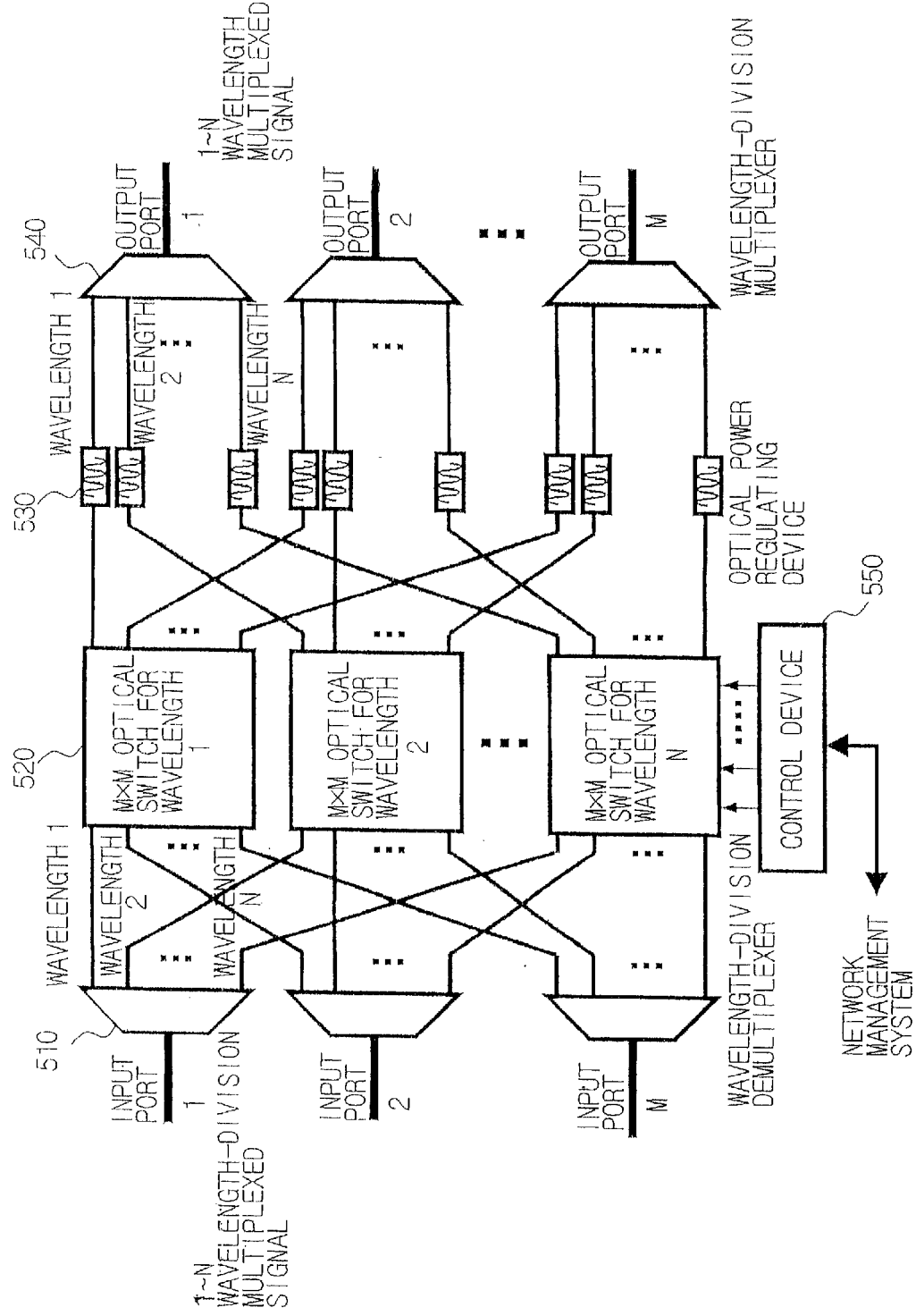
FIG. 5a is a block diagram illustrating conventional M×M optical cross connect system.

FIG. 5a is a block diagram illustrating conventional M×M optical cross-connect system. As shown in FIG. 5a, conventional M×M optical cross-connect system has M input ports and M output ports. The M×M optical cross-connect system includes M 1×N wavelength-division demultiplexers 510, optical switching devices 520, optical power regulating devices 530, and wavelength-division multiplexers 540. The wavelength-division demultiplexers 510 demultiplex N wavelength-division multiplexed optical signals. The optical switching devices 520 receive optical signals from the wavelength-division demultiplexers 510 and route the optical signals to appropriate output ports. The optical power regulating devices 530 receive optical signals from the optical switching devices 520 and reduce differences among the optical signals in terms of power. The wavelength-division multiplexers 540 receive optical signals from the optical power regulating devices 530 and multiplex them.

Now, the operation of conventional M×M optical cross-connect system is reviewed in detail.

First, the wavelength-division demultiplexers 510 demultiplex wavelength-division multiplexed optical signals with different wavelengths and send demultiplexed optical signals to the optical switching devices 520.

The optical switching devices 520 receive optical signals from the demultiplexers and route the optical signals to output ports on the basis of switching control signals provided by the control device 550.

The optical power regulating devices 530 receive optical signals from the optical switching devices 520 and regulate the optical power fluctuation and reduce differences among the optical powers of the optical signals.

Figure 5B:
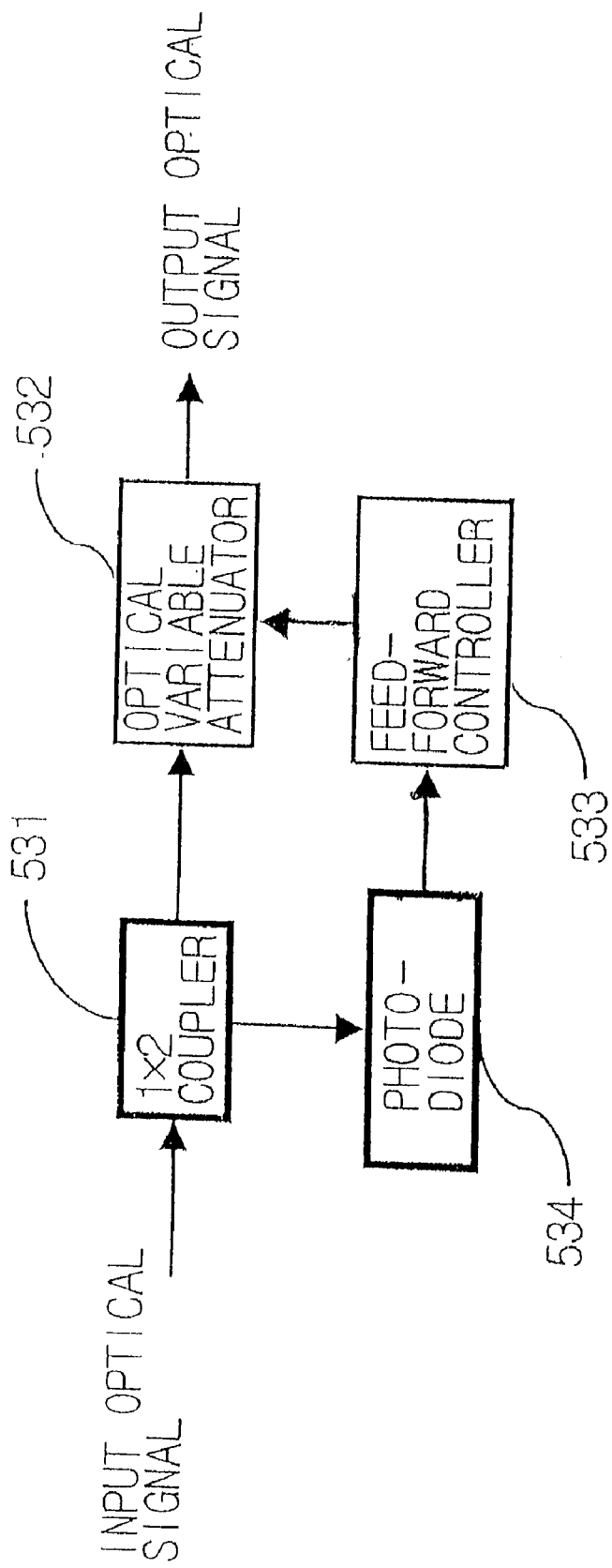
FIG. 5b is a block diagram illustrating a feed-forward optical power regulating device.
Figure 5C:
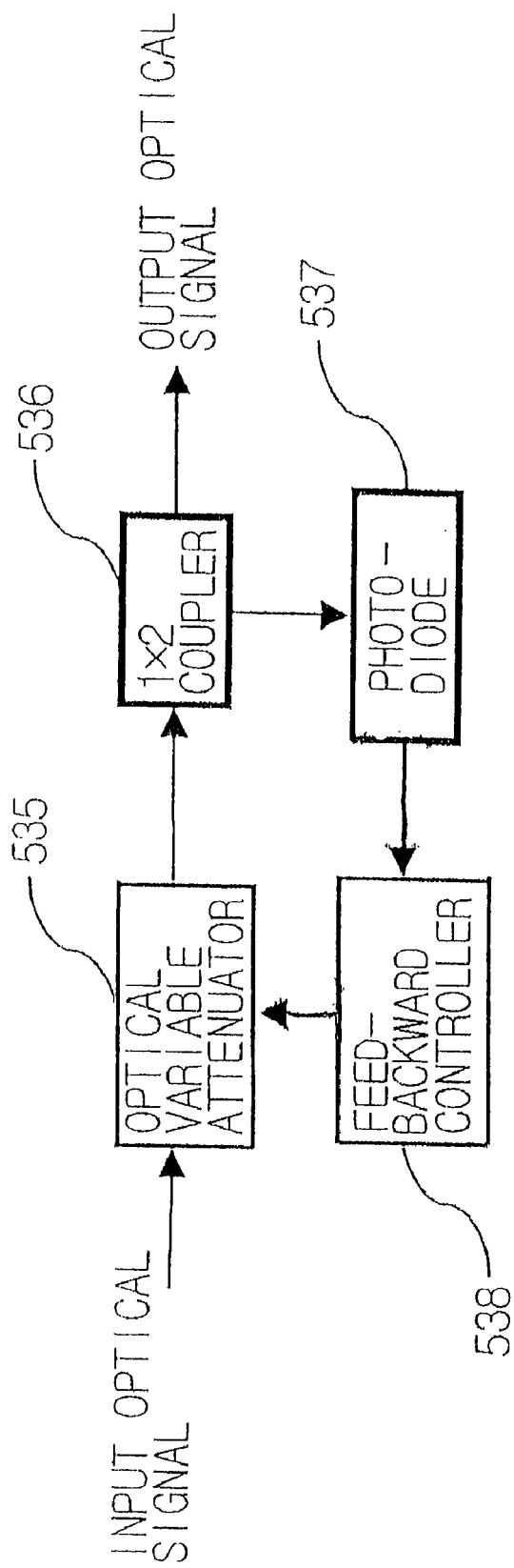
FIG. 5c is a block diagram illustrating a feedback optical power regulating device.

The optical power regulating devices 530 may be implemented as a form of feed-forward shown in FIG. 5b or as a form of feedback shown in FIG. 5c.

The feed-forward optical power regulating device shown in FIG. 5b includes a 1×2 coupler 531, a photo-diode 534, a feed-forward controller 533, and an optical variable attenuator 532. The 1×2 coupler 531 splits the input optical signal in front of the optical variable attenuator 532. The photo-diode 534 converts the split optical signal into an electrical signal. The feed-forward controller 533 receives the electrical signal and provides a control signal that controls the optical variable attenuator 532.

The optical variable attenuator 532 is controlled in proportion to the split input optical signal and therefore the optical power fluctuation in the input optical signal is reduced.

The feedback optical power regulating device shown in FIG. 5c includes an optical variable attenuator 535, a 1×2 coupler 536, a photo-diode 537, a feedback controller 538. The optical variable attenuator 535 receives control signals and varies attenuation of optical power. The 1×2 coupler 536 splits the optical signal passing through the optical variable attenuator 535. The photo-diode 537 converts the split optical signal into an electrical signal. The feedback controller 538 receives the electrical signal and provides a control signal that controls the optical variable attenuator 535.

The optical variable attenuator 535 is controlled in proportion to the split input optical signal and therefore the optical power fluctuation in the input optical signal is reduced.

The wavelength-division multiplexer 540 receives optical signals of various wavelengths from the optical power regulating devices 530 and multiplexes the optical signals.

The control device 550 receives commands from the network management system and controls optical switching devices 520.

Figure 6:
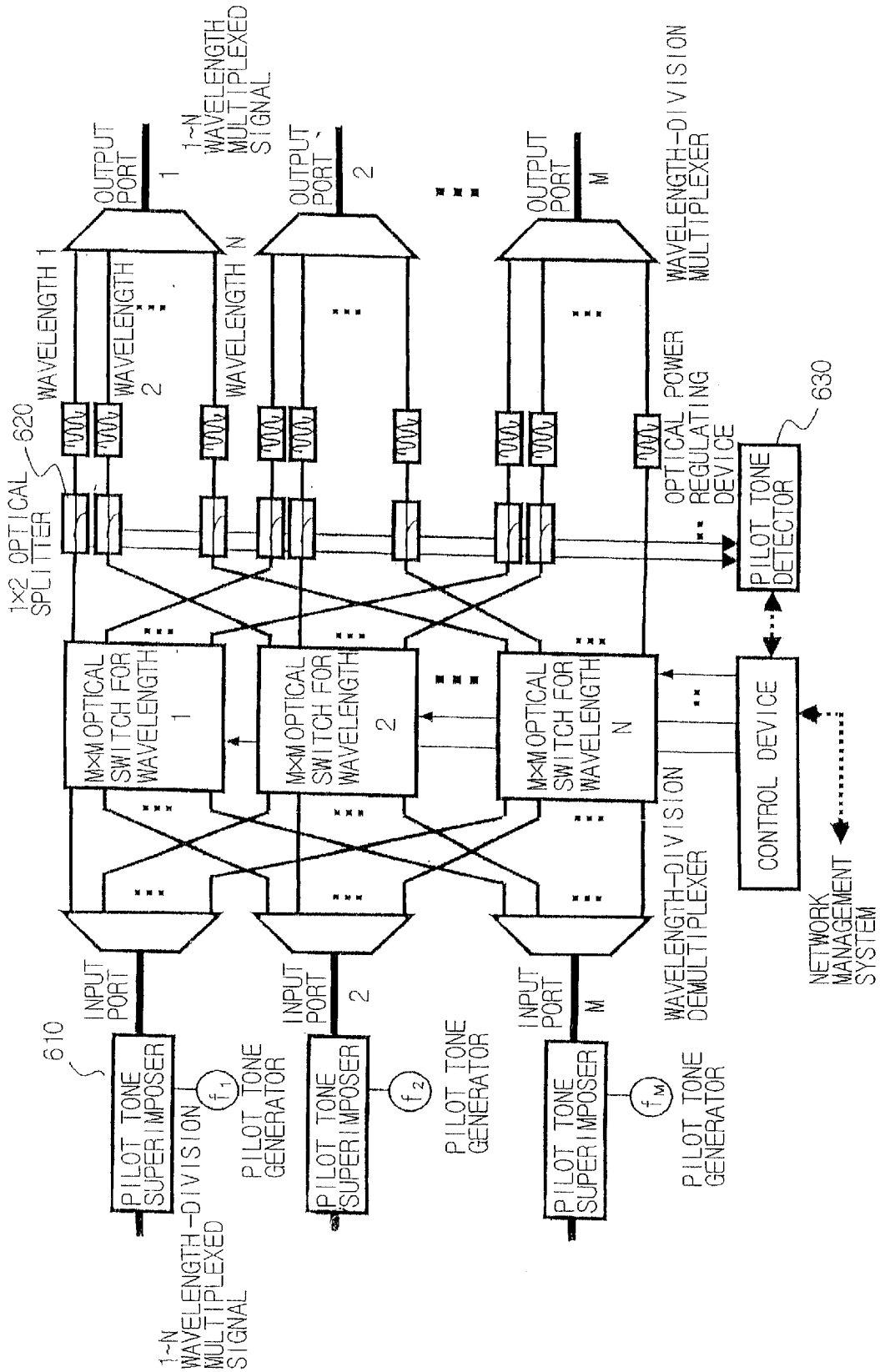
FIG. 6 is a block diagram illustrating an optical path monitoring system in accordance with an embodiment of the present invention.

FIG. 6 is a block diagram illustrating an optical path monitoring system in accordance with an embodiment of the present invention.

Compared with the conventional M×M optical cross-connect system in FIG. 5, an optical path monitoring system in FIG. 6 based on the identification of optical cross-connect input ports in accordance with an embodiment of the present invention further includes pilot tone superimposers 610, 1×2 optical splitters 620, a pilot tone detector 630.

The pilot tone superimposers 610 receive unique pilot tones of low frequency and superimpose the unique pilot tones on wavelength-division multiplexed optical signals provided from input ports.

Therefore, optical signals provided by the same input port have same pilot tone, even though wavelengths of the optical signals are different. On the contrary, the optical signals of same wavelength from another input port may have different pilot tones.

Integrated pilot tone superimposers or accusto-optic modulators may implement the pilot tone superimposers 610.

Optical fiber modulators with accusto-optic effect implements accusto-optic modulators.

The pilot tone superimposer can be implemented by modulating pump light source or pump current source, which are used in optical amplifier compensating transmission loss of optical link. The optical amplifier is connected with input ports of optical cross-connect systems.

FIG. 7a is a block diagram illustrating an optical amplifier achieving energy from pump light source driven by current source modulated with pilot tone and thereby performing pilot tone superimposition and optical amplification simultaneously without employing additional pilot tone superimposers.

As shown in FIG. 7a, an optical amplifier includes a 2×1 wavelength-division multiplexing coupler 710, an active medium 720, a pump light source 730, a current source 740. The 2×1 wavelength-division multiplexing coupler 710 multiplexes input optical signals and pump light. The active medium 720 absorbs the pump light and amplifies optical signals. The pump light source 730 provides energy to the active medium 720. The current source 740 provides current for operating the pump light source 730. The current is modulated with pilot tone provided by the pilot tone generator 750. Therefore, pilot tones are superimposed on wavelength-division multiplexed optical signals that are passed through input ports.

Figure 7B:
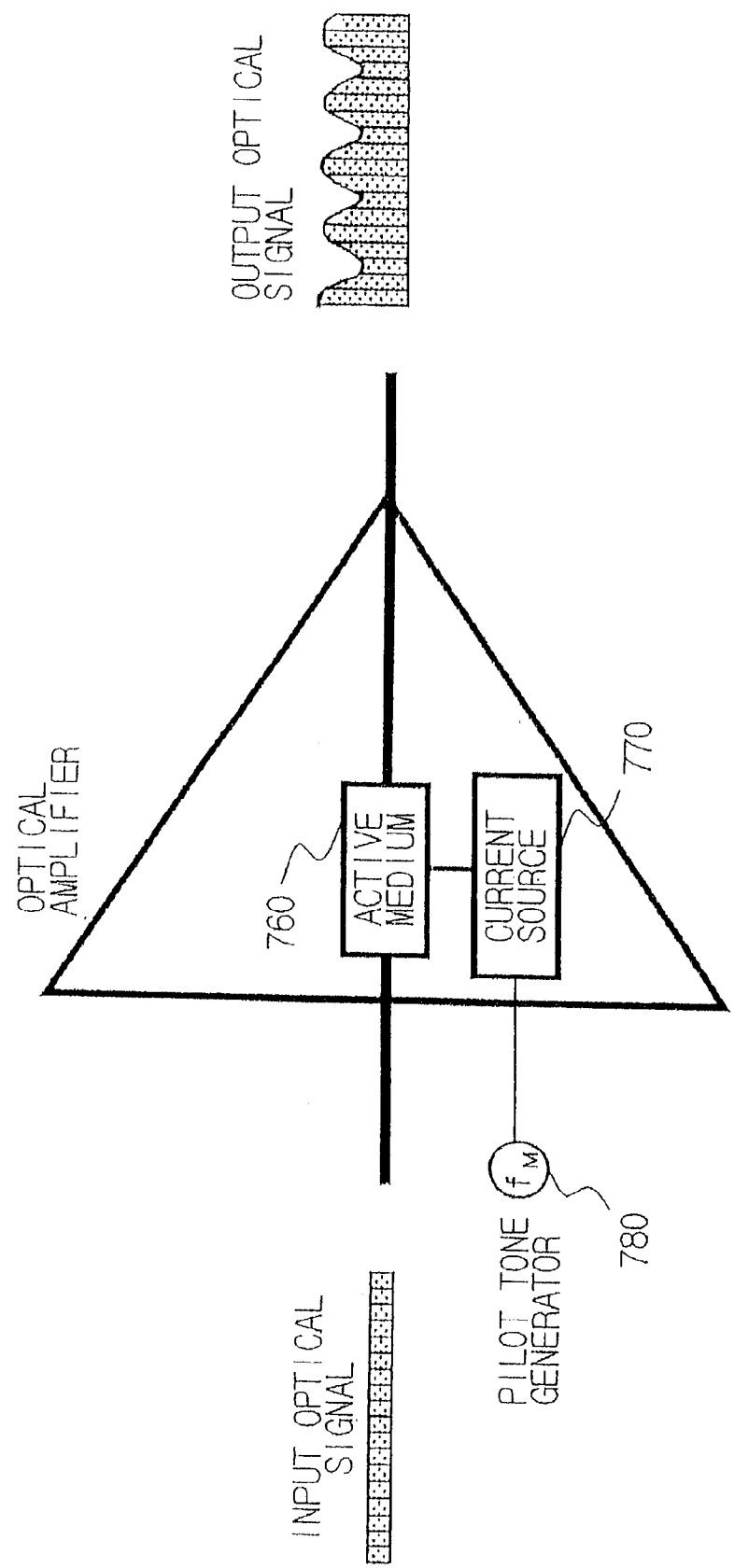
FIG. 7b is a block diagram illustrating an optical amplifier achieving energy from pump current source modulated with pilot tone and thereby performing pilot tone superimposition and optical amplification simultaneously.

FIG. 7b is a block diagram illustrating an optical amplifier achieving energy from current source modulated with pilot tone and thereby performing pilot tone superimposition and optical amplification simultaneously without employing additional pilot tone superimposers.

As shown in FIG. 7b, an optical amplifier includes an active medium 760 and a current source 770. The current source 770 provides current to the active medium 760 and the active medium 760 amplifies optical signals. The current of current source 770 is modulated with pilot tone provided by the pilot tone generator 780. Therefore, pilot tones are superimposed on wavelength-division multiplexed optical signals that propagate through input ports.

In this case, the optical amplifier performs pilot tone superimposition and optical amplification at the same time.

The 1×2 optical splitter 620 splits the pilot tone superimposed optical signals and sends the split signals to the pilot tone detector 630.

The pilot tone detector 630 detects the pilot tone from optical signals and distinguishes which input port of the optical cross-connect system provides the optical signals. Then, the pilot tone detector 630 uses routing information provided from the control device 550 and detects optical path errors.

The pilot tone detector is simply implemented by a photo-diode and an electrical band-pass filter or a lock-in amplifier.

If a lock-in amplifier implements the pilot tone detector, pilot tones that are provided to the pilot tone superimposers can be used as reference signals for lock-in.

Now, the operation of optical path monitoring system based on the identification of optical cross-connect input ports in accordance with an embodiment of the present invention is reviewed.

The wavelength-division multiplexed optical signals with unique pilot tone are demultiplexed into N×M optical signals.

The optical signals of same wavelength are supplied to the optical switching devices 520 and the optical switching devices 520 routes the optical signals on the basis of switching condition.

The pilot tone detector 630 detects pilot tone by splitting a part of optical signals supplied from the optical switching devices 520. Since the optical signals are supplied to the optical switching devices 520 with respect to wavelength, the wavelength of optical signals for the pilot tone detector 630 is also determined.

Once the pilot tone is known, which input port of the optical cross-connect system provides the optical signals can also be known. Therefore, switching state of the optical switching devices 520 and routing state of the optical cross-connect system can be figured out.

Optical paths of optical signals are monitored by comparison the routing state with commands of network management system.

Residual optical signals from the 1×2 optical splitter 620 are supplied to the optical power regulating devices 530.

Since the optical power regulating devices 530 simply regulates the optical power variation and reduces differences of powers among optical signals supplied from the optical switching devices 520 for improvement of network performance, response time of the optical power regulating devices 530 in the conventional M×M optical cross-connect system needs to be short.

Then, the optical power regulating devices in accordance with the present invention remove the pilot tone superimposed by the pilot tone superimposers 610. As a result, same pilot tone can be used at different optical cross-connect systems, even though the size of optical transport network and the number of nodes get increasing.

Figure 8A:
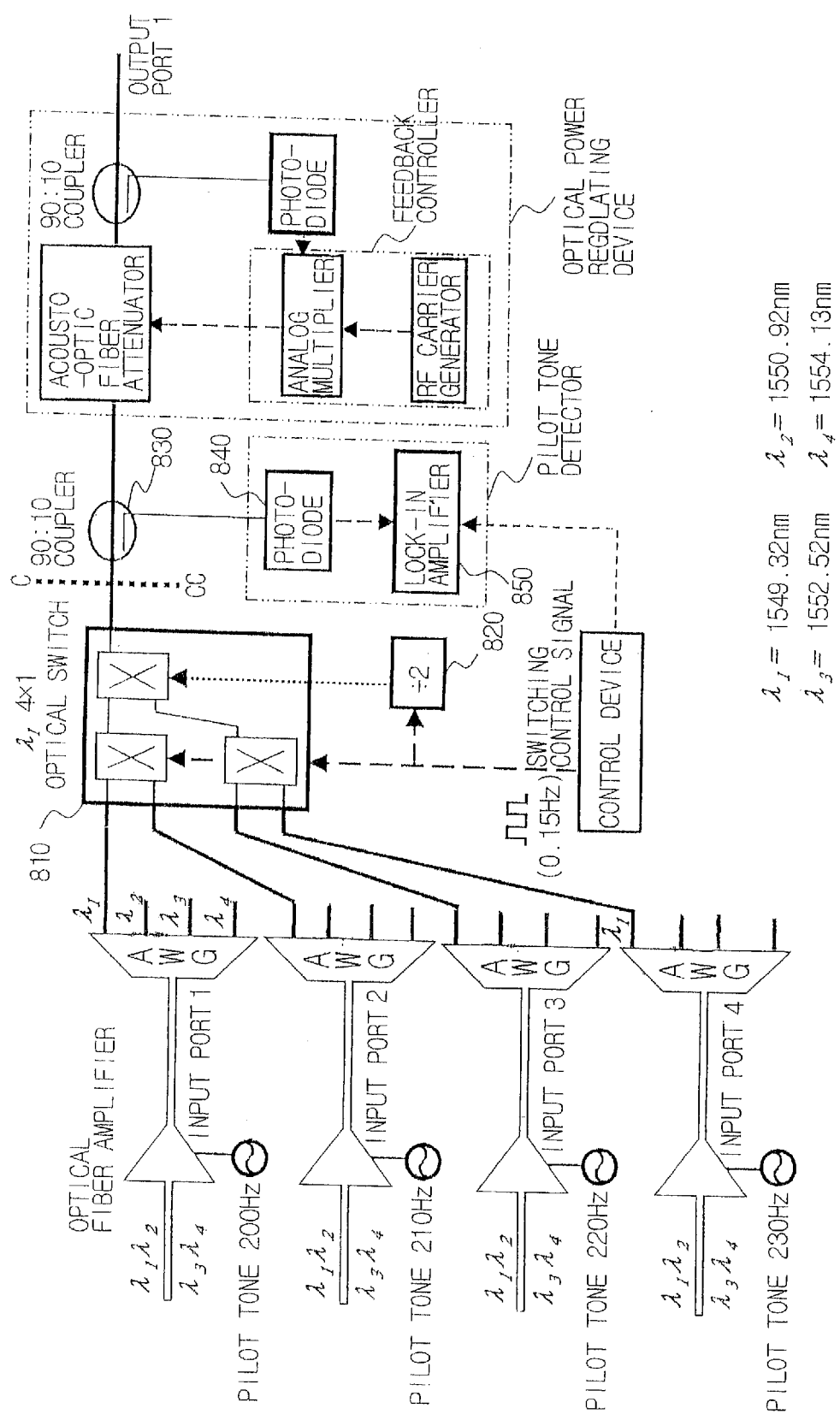
FIG. 8a is an experimental setup illustrating part of a 4×4 optical cross-connect system with an optical path monitoring system in accordance with an embodiment of the present invention.

FIG. 8a is an experimental setup illustrating part of a 4×4 optical cross-connect system with an optical path monitoring system in accordance with an embodiment of the present invention. In FIG. 8a, only part of overall 4×4 optical cross-connect system is shown for monitoring optical path of optical signal of wavelength $\lambda_1$ routing to output port 1.

Optical fiber amplifiers shown in FIG. 7a are used at four input ports as pilot tone superimposers 610. Pilot tones of 200 Hz, 210 Hz, 220 Hz, and 230 Hz are superimposed on wavelength-division multiplexed input optical signals at four input ports, respectively.

Four wavelengths are employed and they are 1549.32 nm, 1550.92 nm, 1552.52 nm, and 1554.13 nm.

Arrayed waveguide gratings (AWG) are used as the wavelength-division demultiplexers 510.

As shown in FIG. 8a, three 2×1 optical switches with two stages implement the 4×1 optical switch.

Periodically, the control device generates switching control signals of 0.15 Hz, loads the switch control signals onto two 2×1 optical switches at first stage in order to change configuration of the 4×1 optical switch. The frequency of the switching control signals is divided by half using frequency divider 820 and the switch control signals of half frequency is loaded to 2×1 optical switches at second stage.

90:10 couplers are used as the 1×2 optical splitters 620. A photo-diode and a lock-in amplifier are used as the pilot tone detector 630 and receive the pilot tone of reference signal from the control device.

An acousto-optic fiber variable attenuator, a 90:10 coupler, a photo-diode, an analog multiplier, and a RF carrier generator implement the optical power regulating devices 530 in FIG. 5c.

An acousto-optic fiber variable attenuator is used as an optical variable attenuator and an analog multiplier, and a RF carrier generator are used as a feedback control device.

The wavelength-division multiplexers 540 are not shown since they are not necessary to monitor optical paths routed to output port 1 among input optical signals of $\lambda_1$ supplied from four input ports.

Figure 8B:
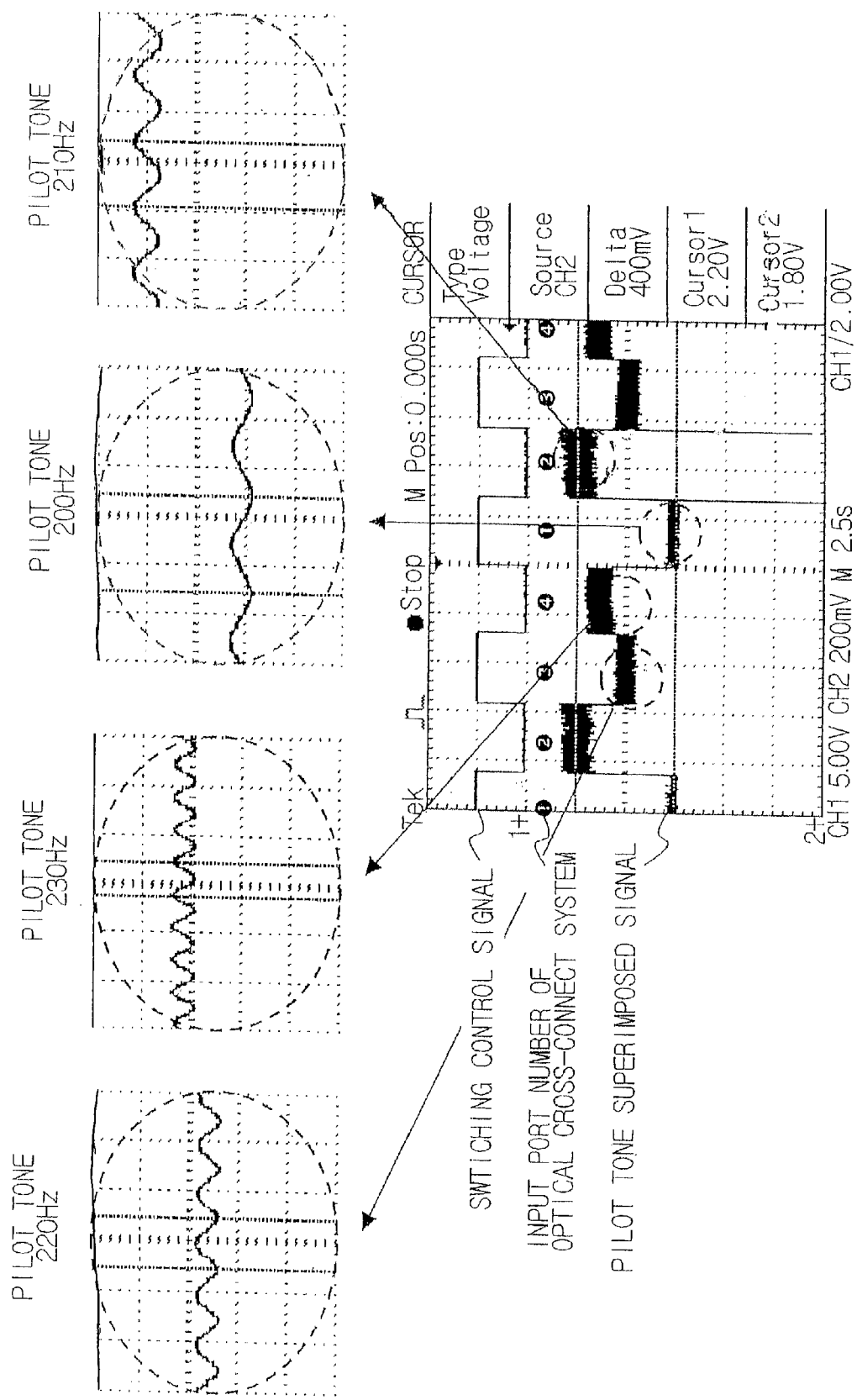
FIG. 8b is waveforms of signals illustrating optical signals at C–CC with respect to switching control signals of the control device of FIG. 8a, pilot tones superimposed on the optical signals by pilot tone superimposer.

FIG. 8b is waveforms of signals illustrating optical signals at C–CC with respect to switching control signals of the control device of FIG. 8a. Pilot tones are superimposed on the optical signals by pilot tone superimposer.

As shown in FIG. 8b, switching control signals are periodically repeated. Input port of optical cross-connect system for optical signals of $\lambda_1$ that are routed to output port 1 are repeated half of the frequency of the switching control signals.

This results that four pilot tone superimposed signals are generated at 4×1 optical switches periodically.

Power variation ((maximum-minimum)/average*100) of the four superimposed signals is ((2.20–1.80)/2.00*100) = 20%.

Figure 8C:
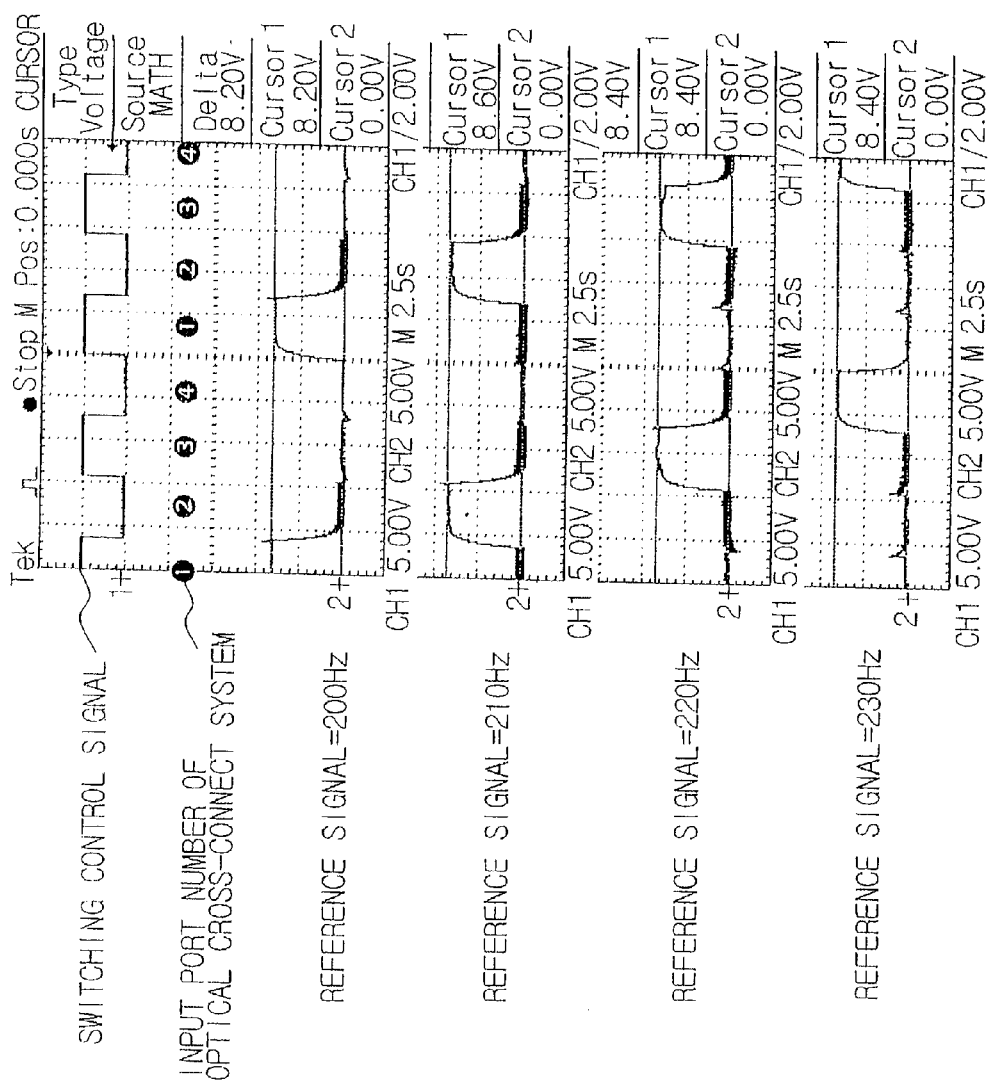
FIG. 8c is waveforms of signals illustrating electrical signals detected by pilot tone detector of FIG. 8a, with respect to the reference signal of pilot tone.

FIG. 8c is waveforms of signals illustrating electrical signals detected by pilot tone detector of FIG. 8a, with respect to the reference signal of pilot tone detector.

As shown in FIG. 8c, output of the pilot tone detector is high when pilot tone of input optical signal for the pilot tone detector is same as the reference signal. When pilot tone of input optical signal for the pilot tone detector is not same as the reference signal, output of the pilot tone detector is always low.

Figure 8D:
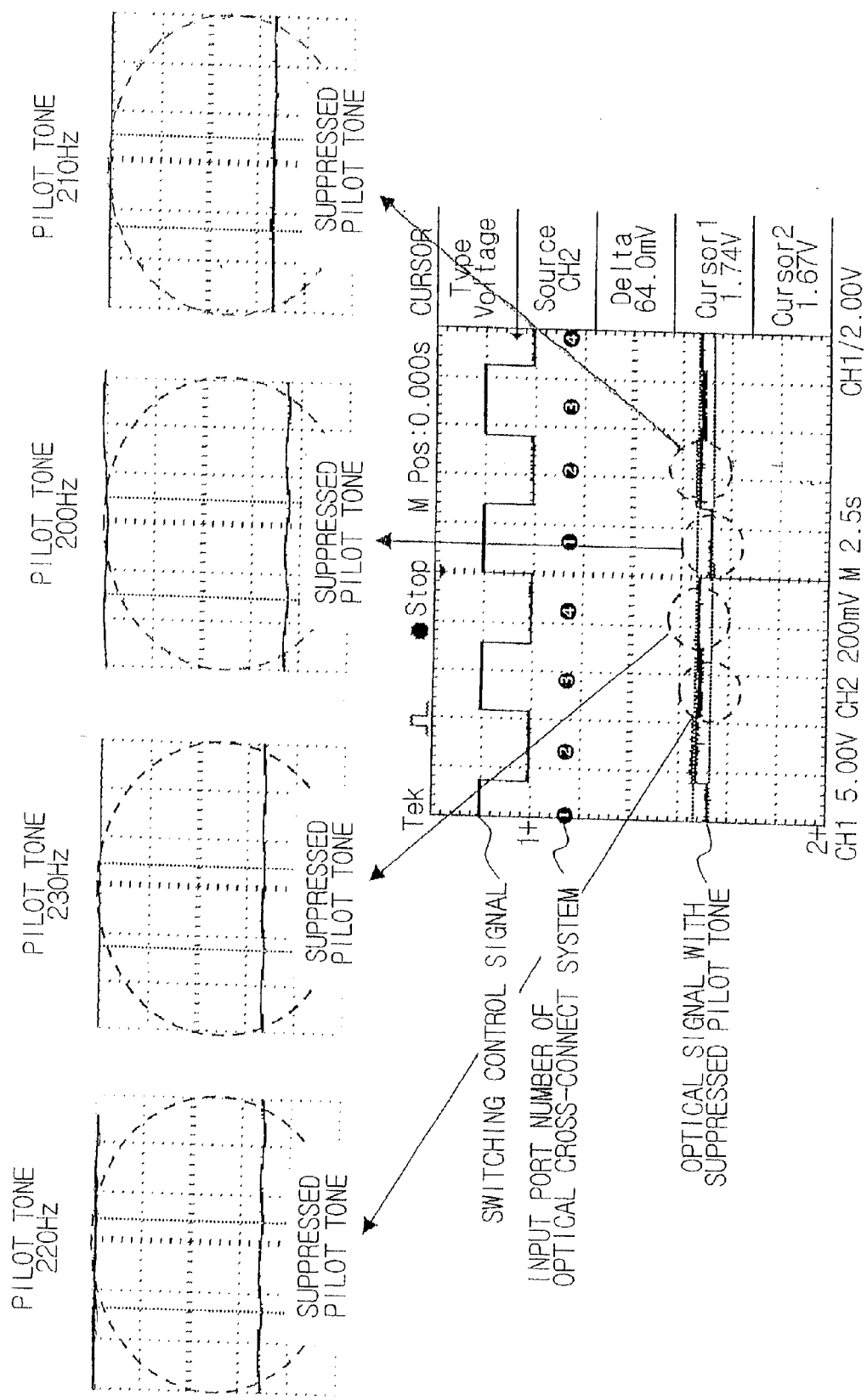

FIG. 8d has waveforms of signals illustrating optical power regulation and pilot tone suppression caused by the optical power regulating device of FIG. 8a.

As shown in FIG. 8d, amplitude of each pilot tone gets decreased and power variation among four optical signals becomes small from 20% to (1.74–1.67)/1.69*100=4.1%.

With optical variable attenuators of better performance, the amplitude of pilot tone and the power variation can be more suppressed.

The optical path monitoring device in accordance with the present invention is advantageous in that it doesn't employ expensive optical components and can be simply implemented.

Additionally, the optical path monitoring device in accordance with the present invention is effective in increasing operational fidelity of optical transport network.

Additionally, even though the size of optical transport network and the number of nodes get increasing, same pilot tones can be used at different optical cross-connect systems.

Additionally, the optical path monitoring device in accordance with the present invention requires the same number of pilot tones as input ports and the number of wavelength-division multiplexed wavelengths is not restricted.

Although representative embodiments of the present invention have been disclosed for illustrative purpose, those who are skilled in the art will appreciate that various modifications, additions and substitutions are possible without departing from the scope and spirit of the present invention as defined in the accompanying claims.

What we claim:

1. An optical path monitoring apparatus in an optical cross-connect system having M input ports and M output ports, said optical cross-connect system including M 1×N wavelength-division demultiplexers; M N×1 wavelength-division multiplexers; N M×M optical switching devices disposed between the demultiplexers and the multiplexers for receiving optical signals from the demultiplexers and routing the optical signals to the output ports; optical power regulating devices disposed between the optical switching devices and the multiplexers; and a control device for providing switching control signal with the optical switching devices, said optical path monitoring apparatus comprising:

M pilot tone superimposers having an input and output disposed in series with a respective one of the input ports for receiving a unique pilot tone and for superimposing the pilot tone on wavelength-division multiplexed optical signals, and providing the superimposed signals to the demultiplexers, wherein the pilot tone input in each pilot tone superimposer is different than the pilot tone input in the other pilot tone superimposers;

a plurality of optical splitters for splitting optical signals provided by said optical switching devices, each of the optical splitters is disposed between a respective one of the output ports of optical switching devices and a respective one of the input ports of the optical power regulating devices;

a pilot tone detector for receiving the split optical signals from the optical splitters, extracting the pilot tone and thereby identifying the input port of the optical cross-connect system providing said optical signals, and detecting optical path errors; and wherein response time of said optical power regulating device being short enough to remove said pilot tone superimposed on said wavelength-division multiplexed optical signals.

2. The optical path monitoring apparatus of claim 1, wherein said pilot tone superimposers comprises:

a wavelength-division multiplexing coupler for multiplexing input optical signals and pump light source;

an active medium for absorbing pump light and amplifying optical signals;

a pump light source for providing energy to said active medium; and a current source for providing current to said pump light source, said current modulated with pilot tone.

3. The optical path monitoring apparatus of claim 1, wherein said pilot tone superimposer comprises:

an active medium for receiving current and amplifying optical signals; and a current source for providing current to said active medium, said current modulated with pilot tone.

4. The optical path monitoring apparatus of claim 1, wherein said pilot tone superimposer is an accusto-optic modulator.

5. The optical path monitoring apparatus of claim 1, wherein said pilot tone superimposer is an integrated optical modulator.

6. The optical path monitoring apparatus of claim 1, wherein said pilot tone detector comprises an electrical band-pass filter, said electrical band-pass filter transmitting pilot tone of a particular input port.

7. The optical path monitoring apparatus of claim 1, wherein said pilot tone detector comprises a lock-in amplifier, said lock-in amplifier using the same pilot tone as the reference signal.

8. The optical path monitoring apparatus of claim 1, wherein said optical power regulating device uses an accusto-optic modulator as an optical variable attenuator.

9. The optical path monitoring apparatus of claim 1, wherein said optical power regulating device uses an integrated optical modulator as an optical variable attenuator.

* * * * *